US009177327B2

(12) United States Patent
Chang et al.

(10) Patent No.: US 9,177,327 B2
(45) Date of Patent: Nov. 3, 2015

(54) SEQUENTIAL ENGINE THAT COMPUTES USER AND OFFER MATCHING INTO MICRO-SEGMENTS

(75) Inventors: Walter Chang, San Jose, CA (US); Geoff Baum, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/039,242

(22) Filed: Mar. 2, 2011

(65) Prior Publication Data

US 2012/0226700 A1 Sep. 6, 2012

(51) Int. Cl.
*G06F 17/30* (2006.01)
*G06Q 30/02* (2012.01)

(52) U.S. Cl.
CPC .................................. *G06Q 30/0251* (2013.01)

(58) Field of Classification Search
None
See application file for complete search history.

(56) References Cited

U.S. PATENT DOCUMENTS

| | | | |
|---|---|---|---|
| 5,636,346 A | 6/1997 | Saxe | |
| 5,892,900 A | 4/1999 | Ginter et al. | |
| 6,061,658 A | 5/2000 | Chou et al. | |
| 6,317,872 B1* | 11/2001 | Gee et al. | 717/152 |
| 6,519,571 B1 | 2/2003 | Guheen et al. | |
| 7,072,858 B1 | 7/2006 | Litzow et al. | |
| 7,174,381 B2 | 2/2007 | Gulko et al. | |
| 7,224,185 B2* | 5/2007 | Campbell et al. | 326/46 |
| 7,599,851 B2 | 10/2009 | Frengut et al. | |
| 7,992,171 B2 | 8/2011 | Amidon et al. | |
| 8,326,630 B2 | 12/2012 | Chandrasekar et al. | |
| 8,630,902 B2 | 1/2014 | Baum et al. | |
| 8,635,107 B2 | 1/2014 | Chang et al. | |
| 8,635,226 B2* | 1/2014 | Chang et al. | 707/740 |

(Continued)

FOREIGN PATENT DOCUMENTS

| | | |
|---|---|---|
| CN | 1535535 | 10/2004 |
| CN | 101520878 | 9/2009 |

(Continued)

OTHER PUBLICATIONS

"Lawson M3 Manufacturing Operations: Attribute Control", Lawson Software, Inc. 5636346,(2008), 12 pages.

(Continued)

*Primary Examiner* — Rehana Perveen
*Assistant Examiner* — Hung Havan
(74) *Attorney, Agent, or Firm* — Wolfe-SBMC

(57) ABSTRACT

User data and a plurality of micro-segment definitions are received. Each micro-segment definition in the plurality of micro-segment definitions corresponds to one or more offers in an offer provider campaign. Further, a micro-segment parser parses each micro-segment definition from the plurality of micro-segment definitions into a plurality of parsed expression segments that indicate a plurality of micro-segment condition rules. In addition, a compiler compiles the plurality of parsed expression segments into an executable object that indicates a plurality of instructions to determine if the user data matches the plurality of micro-segment definitions. Each micro-segment definition is also serially processed, with a sequential evaluation engine, to apply the plurality of micro-segment condition rules to the user data to determine a match of a user belonging to a micro-segment. Further, the sequential evaluation engine assigns a score to indicate the strength of each match. In addition, the process ranks, with the sequential evaluation engine, each match according to the score for each match.

20 Claims, 17 Drawing Sheets

(56) References Cited

U.S. PATENT DOCUMENTS

| | | | |
|---|---|---|---|
| 8,700,468 | B2 | 4/2014 | Chang et al. |
| 8,799,060 | B2 | 8/2014 | Gillenson |
| 2001/0013009 | A1* | 8/2001 | Greening et al. ............... 705/10 |
| 2001/0032128 | A1* | 10/2001 | Kepecs ........................... 705/14 |
| 2003/0023482 | A1 | 1/2003 | Messner et al. |
| 2005/0114366 | A1 | 5/2005 | Mathai et al. |
| 2006/0095327 | A1 | 5/2006 | Vaughn et al. |
| 2006/0212355 | A1 | 9/2006 | Teague |
| 2007/0230706 | A1 | 10/2007 | Youn |
| 2008/0090513 | A1 | 4/2008 | Collins et al. |
| 2008/0103903 | A1 | 5/2008 | Flake et al. |
| 2008/0163071 | A1 | 7/2008 | Abbott et al. |
| 2009/0006188 | A1 | 1/2009 | Guo et al. |
| 2009/0132275 | A1 | 5/2009 | Jung et al. |
| 2009/0164441 | A1 | 6/2009 | Cheyer |
| 2009/0254971 | A1 | 10/2009 | Herz et al. |
| 2009/0271263 | A1 | 10/2009 | Regmi et al. |
| 2010/0042471 | A1 | 2/2010 | Chang et al. |
| 2010/0094878 | A1 | 4/2010 | Soroca et al. |
| 2010/0106568 | A1 | 4/2010 | Grimes |
| 2010/0138867 | A1 | 6/2010 | Wong et al. |
| 2010/0211464 | A1 | 8/2010 | Zhu et al. |
| 2010/0268600 | A1 | 10/2010 | Banko et al. |
| 2012/0226559 | A1 | 9/2012 | Baum et al. |
| 2012/0226562 | A1 | 9/2012 | Baum et al. |
| 2012/0226697 | A1 | 9/2012 | Chang et al. |
| 2013/0132220 | A1 | 5/2013 | Baum |
| 2013/0132365 | A1 | 5/2013 | Chang |

FOREIGN PATENT DOCUMENTS

| | | |
|---|---|---|
| CN | 101535944 | 9/2009 |
| CN | 101694659 | 4/2010 |
| CN | 102708130 | 10/2012 |
| CN | 102708131 | 10/2012 |
| CN | 102722833 | 10/2012 |
| CN | 102737333 | 10/2012 |
| CN | 102737334 | 10/2012 |

OTHER PUBLICATIONS

"Non-Final Office Action", U.S. Appl. No. 12/862,386, (Oct. 9, 2012), 8 pages.
"Non-Final Office Action", U.S. Appl. No. 13/039,177, (Sep. 10, 2012), 19 pages.
"Non-Final Office Action", U.S. Appl. No. 13/039,207, (Sep. 13, 2012), 16 pages.
"Non-Final Office Action", U.S. Appl. No. 13/039,257, (Jul. 18, 2012), 10 pages.
"Non-Final Office Action", U.S. Appl. No. 13/153,328, (Jun. 8, 2012), 8 pages.
"SQL Tutorials—Lesson 1: SQL Startup", Retrieved from: <http://www.functionx.com/sql/Lesson01.htm> on Aug. 20, 2012,(2004-2007), 4 pages.
De Haan, Lex et al., "Nulls: Nothing to Worry About", Retrieved from: <http://wvwv.oracle.com/technetwork/issue-archive/2005/05-jul/o45sql-097727.html> on Aug. 20, 2012,(Jul. 2005), 1 page.
Preiss, Bruno R., "Data Structures and Algorithms with Object-Oriented Design Patterns in Java", Retrieved from: <http://www.brpreiss.com/books/opus5/html/page264.html> on Aug. 20, 2012,(1998), 2 pages.
"Final Office Action", U.S. Appl. No. 12/862,386, (Apr. 9, 2013),12 pages.
"Final Office Action", U.S. Appl. No. 12/862,386, (Jun. 26, 2013),13 pages.
"Final Office Action", U.S. Appl. No. 13/039,266, (Aug. 5, 2013),14 pages.
"Non-Final Office Action", U.S. Appl. No. 13/039,207, (Aug. 15, 2013),20 pages.
"Notice of Allowance", U.S. Appl. No. 13/039,177, (Sep. 4, 2013), 7 pages.
"Notice of Allowance", U.S. Appl. No. 13/039,257, (Sep. 12, 2013),14 pages.
"Notice of Allowance", U.S. Appl. No. 13/153,328, (Sep. 4, 2013), 7 pages.
Wen-Xiu, et al., "Market basket analysis based on text segmentation and association rule mining", *First International Conference on Networking and Distributed Computing*, (Oct. 2010), pp. 309-313.
"Final Office Action", U.S. Appl. No. 12/862,386, (Mar. 26, 2013), 11 pages.
"Final Office Action", U.S. Appl. No. 13/039,177, (Dec. 12, 2012), 20 pages.
"Final Office Action", U.S. Appl. No. 13/039,207, (Dec. 31, 2012), 13 pages.
"Final Office Action", U.S. Appl. No. 13/039,257, (Jan. 3, 2013), 12 pages.
"Final Office Action", U.S. Appl. No. 13/153,328, (Dec. 3, 2012), 14 pages.
"Non-Final Office Action", U.S. Appl. No. 13/039,266, (Mar. 12, 2013), 12 pages.
"Non-Final Office Action", U.S. Appl. No. 13/153,328, (Mar. 20, 2013), 13 pages.
Dattero, Ronald et al., "Programming Languages and Gender", *Communications of the ACM*, vol. 47, No. 1, (Jan. 2004), pp. 99-102.
Lam, Wang "The Behavior of NULLs in SQL", Retrieved from: <http://www-cs-students.stanford.edu/`wlam/compsci/sqlnulls>on Dec. 26, 2012, (Aug. 5, 2004), 4 pages.
"Notice of Allowance", U.S. Appl. No. 13/039,207, Dec. 23, 2013, 8 pages.
"Non-Final Office Action", U.S. Appl. No. 12/862,386, Jan. 2, 2015, 15 pages.
"Final Office Action", U.S. Appl. No. 12/862,386, Jul. 16, 2015, 10 pages.
"Non-Final Office Action", U.S. Appl. No. 13/039,266, May 22, 2015, 14 pages.

* cited by examiner

```
(ExampleUser.zipcode in (94301, 94302, 94303, 94304, 94306, 94309) or
 ExampleUser.zipcode between (94085, 94089)) or
 ExampleUser.zipcode between (95050, 95056)) or
 ExampleUser.zipcode between (95010, 95196))
) and
(
 (ExampleCore.Gender == 'M') and
 (ExampleCore.Income between(50000,100000)) and
 (DataProvider1Data.MonthlyPowerBill >= 200)
) or
(ExampleWish.ProductCategory in ("Greer Electronics",
                                 "Power Conservation")) or
(ExampleBran.BrandName in ("P3 International", "Brand XYZ"))
)
```
↖ 700

*Figure 7*

| Disk Page 1 | 1001 | 9876543210 | M | 28 | 45000 | 0 |
| Disk Page 2 | 1002 | 6346554681 | F | 42 | 62000 | 3 |
| Disk Page 3 | 1003 | 1920948567 | F | 39 | 27000 | 1 |
| Disk Page 4 | 1004 | 3829403988 | M | 55 | 75000 | 2 |

SEQUENTIAL ENGINE THAT COMPUTES USER AND OFFER MATCHING INTO MICRO-SEGMENTS

BACKGROUND

1. Field

This disclosure generally relates to classification of consumers. More particularly, the disclosure relates to determining micro-segments to which consumers belong.

2. General Background

Content providers, merchants, and marketers have to precisely define and target highly specific market segments in order to effectively deliver the most relevant online content. Examples of the most relevant online content are advertising, offers, entertainment, news, etc.

A micro-segment is a precise division of a market or population that is typically identified by marketers through advanced technology and techniques. For example, data mining, artificial intelligence, and various algorithms may be utilized. These technologies and techniques are utilized to group consumers into fine-grained segments by recognizing and predicting minute consumer spending and behavioral patterns, i.e., micro-segmentation. In other words, a micro-segment is a group of (purchase) decision makers who share similar attributes, purchase behavior, and/or level of interest in a specific set of features. In the current environment, however, classifying and segmenting a new user community into micro-segments may be difficult for a number of reasons. In particular, consumers are increasingly filtering content and marketing messages, which reduces marketer efficacy. Further, even as more consumer data and behaviors are collected, most are under-utilized because of the lack of industry expertise and limitations of available technology. In addition, meaningful segmentation within newly created user communities and populations is difficult.

Further, segmentation difficulties also affect numerous websites that leverage the recorded behaviors of large numbers of site users in determining recommended content, products, and services for various user segments. Recommendation systems utilize algorithms that may vary from k-nearest neighbor approaches to preference/interest/taste similarity methods, e.g., found by using Pearson Correlation, to collaborative filtering algorithms, e.g., people who buy X also buy Y. A challenge with all of these approaches is having an accurate segmentation of very large user populations based on recorded preferences and behaviors before the system can make recommendations.

SUMMARY

In one aspect of the disclosure, a computer program product is provided. The computer program product includes a computer useable medium having a computer readable program. The computer readable program when executed on a computer causes the computer to receive user data and a plurality of micro-segment definitions such that each micro-segment definition in the plurality of micro-segment definitions corresponds to one or more offers in an offer provider campaign. Further, the computer readable program when executed on the computer causes the computer to parse, with a micro-segment parser, each micro-segment definition from the plurality of micro-segment definitions into a plurality of parsed expression segments that indicate a plurality of micro-segment condition rules. In addition, the computer readable program when executed on the computer causes the computer to compile, with a compiler, the plurality of parsed expression segments into an executable object that indicates a plurality of instructions to determine if the user data matches the plurality of micro-segment definitions. The computer readable program when executed on the computer also causes the computer to serially process each micro-segment definition, with a sequential evaluation engine, to apply the plurality of micro-segment condition rules to the user data to determine a match of a user belonging to a micro-segment. Further, the computer readable program when executed on the computer causes the computer to assign, with the sequential evaluation engine, a score to indicate the strength of each match. In addition, the computer readable program when executed on the computer causes the computer to rank, with the sequential evaluation engine, each match according to the score for each match.

In another aspect of the disclosure, a process is provided. The process receives user data and a plurality of micro-segment definitions such that each micro-segment definition in the plurality of micro-segment definitions corresponds to one or more offers in an offer provider campaign. Further, the process parses, with a micro-segment parser, each micro-segment definition from the plurality of micro-segment definitions into a plurality of parsed expression segments that indicate a plurality of micro-segment condition rules. In addition, the process compiles, with a compiler, the plurality of parsed expression segments into an executable object that indicates a plurality of instructions to determine if the user data matches the plurality of micro-segment definitions. The process also serially processes each micro-segment definition, with a sequential evaluation engine, to apply the plurality of micro-segment condition rules to the user data to determine a match of a user belonging to a micro-segment. Further, the process assigns, with the sequential evaluation engine, a score to indicate the strength of each match. In addition, the process ranks, with the sequential evaluation engine, each match according to the score for each match.

In yet another aspect of the disclosure, a system is provided. The system includes a reception module that receives user data and a plurality of micro-segment definitions such that each micro-segment definition in the plurality of micro-segment definitions corresponds to one or more offers in an offer provider campaign. Further, the system includes a micro-segment parser that parses each micro-segment definition from the plurality of micro-segment definitions into a plurality of parsed expression segments that indicate a plurality of micro-segment condition rules. In addition, the system includes a compiler that compiles the plurality of parsed expression segments into an executable object that indicates a plurality of instructions to determine if the user data matches the plurality of micro-segment definitions. The system also includes a sequential evaluation engine that (i) serially processes each micro-segment definition to apply the plurality of micro-segment condition rules to the user data to determine a match of a user belonging to a micro-segment, (ii) assigns a score to indicate the strength of each match, and (iii) ranks each match according to the score for each match.

DRAWINGS

The above-mentioned features of the present disclosure will become more apparent with reference to the following description taken in conjunction with the accompanying drawings wherein like reference numerals denote like elements and in which:

FIG. 7 illustrates an example of code that may be utilized for the expression tree illustrated in FIG. 6.

FIG. 13A illustrates a row storage data layout for the segment attributes illustrated in FIG. 12.

DETAILED DESCRIPTION

Figure 1:
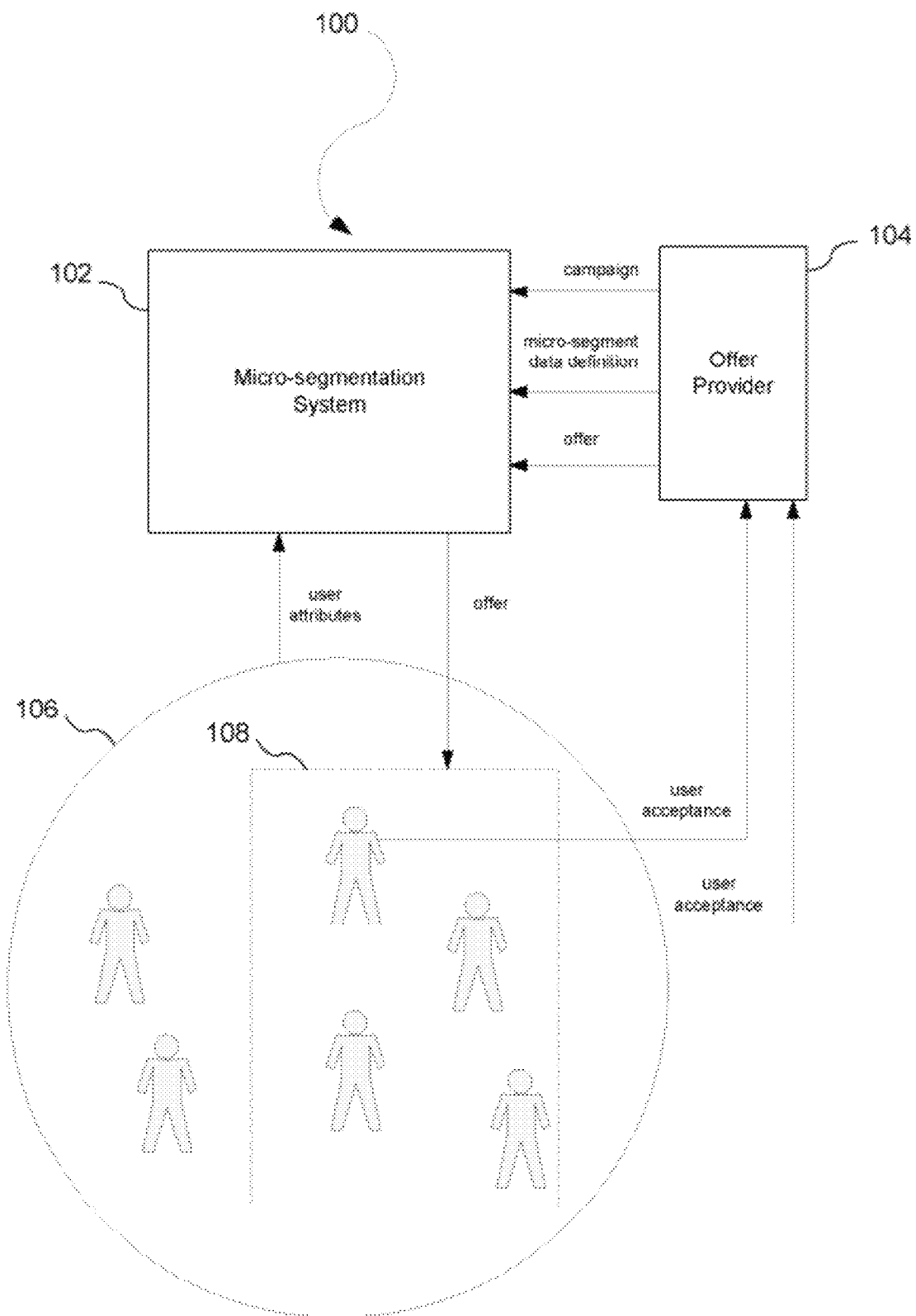
FIG. 1 illustrates a micro-segmentation system configuration.

A sequential engine determines which micro-segments users belong to. In one embodiment, the sequential engine has a single computation process or thread, e.g., a single core and linear sequential processing program. The sequential engine utilizes a definition of the micro-segment and user data to compute a Boolean expression of True or False to determine whether a predicate of the micro-segment is met. Further, non-Boolean predicates may also be utilized, which result in real value results. The segment description is parsed into a segment definition parse tree. The segment definition parse tree is then compiled into bytecode. The bytecode is then executed to return segment assignments and scores.

In one embodiment, demographic attributes and behavioral interests of a user are generalized. A segment has a collection of attribute comparison predicates, e.g., Gender==Male, connected by Boolean AND/OR operators, e.g., (Gender==Male) AND (Age between (20,30)). Accordingly, if a quantity n total data attributes are available, then the number of micro-segments may equal $2^n-1$, i.e., the total combination of n attributes. The micro-segment objects allow marketers to define micro-segments from this large space of attributes. Those generalized demographic attributes and behavioral interest are then encapsulated into an object. The behavioral interests may include both positive and negative interests, which allows creation of a comprehensive affinity model. An example of positive or negative interests is likes or dislikes of a brand. In addition, the object supports any complex attribute or interest rule structure that is represented as a syntactic expression tree. Attributes and predicate expressions for matching and recommendations may then be developed for that syntactic expressions tree. Predicates can be connected through conjunctive operators and/or disjunctive operators to create arbitrarily complex micro-segment expressions.

The micro-segment object is portable. In other words, the micro-segment is not hardwired to a particular marketing campaign. The micro-segment is reusable. Accordingly, the micro-segment object provides portable analytics without specific details. In one embodiment, the micro-segment is an opaque encoding of a set of attributes common to a population of consumers. For example, a micro-segment including males ages twenty-five with income between eighty thousand dollars to one hundred thousand dollars, and with an interest in sports cars may be encoded as SEG-XYZ. New consumers assigned into segment SEG-XYZ will by definition have the same listed attributes. Given a larger population of consumers with other micro-segments, marketers that share micro-segment definitions and data may perform analytics utilizing the SEG-XYZ encoding without revealing to others the actual definition of the micro-segment. A micro-segment definition is portable as a micro-segment that was successful for one marketer may be shared and utilized by another marketer. The analytics themselves may be performed in a private manner in which the attributes are not revealed to other parties. This configuration is useful in cases when marketers have made prior agreements to share segment definitions and microsegment consumer data.

Numerous high-value micro-segments within newly created user communities may be identified and created. Advertisers and marketers can automate the creation of customized micro-segments to which they can deliver highly targeted and relevant content across a range of multimedia devices. After the micro-segments are identified, they can be utilized to automate the delivery of content, personalized direct micromarketing, and micro-promotion campaigns, which target and appeal to the specified tastes, needs, wants, and desires of the member individuals. Micro-marketing is the process by which the system models each consumer as having different ideas and feelings about a company's products, services, prices, and promotions, and appeals to them in an appropriate manner. A consumer refers to a user who is a consumer and utilizes the configurations provided for herein. The micro-segments provide a finer level of granularity than segments. Accordingly, the micro-segments may assist marketers in recognizing and predicting minute consumer spending and behavioral patterns. For example, the micro-segments may be utilized to leverage data sources such as core demographics, category spending over time, fine-grained purchase history, and buying intent. Some of these data sources such as purchase history and category spending may be validated as they are coming from third parties, e.g., credit card companies. As a result, marketers are able to provide more accurate, precise, and targeted offers.

Further, membership within micro-segments may be incrementally and continuously updated within micro-segments. In addition, intentional semantics may be automatically detected and inferred utilizing additionally analytics. For example, if a consumer belongs to a high-end car interest segment, a high-end camera interest segment, and a high-end watch segment, the system may infer that if the consumer has expressed a generic interest in shirts, the consumer may additionally fit into a high-ed shirt interest segment.

Further, recommendations may be quickly and accurately generated regarding content, products and services to users within each micro-segment. A recommendation system may be utilized to perform the recommendations. The recommendation system is a system that employs information clustering and filtering techniques that attempt to recommend information content or product items that are likely to be of interest to a specific user (consumer) based on the cluster or segment he or she is in. In one embodiment, a recommendation system compares a user's behaviors and/or explicit profile to some reference characteristics and then seeks to predict the interest 'rating' that a user would give to an item they may have not yet considered. These characteristics may be from the information or product item (using a content-based and/or attribute approach) or the user's social environment (using collaborative filtering approaches).

In one embodiment, each micro-segment includes a specific set of key discriminating features ("KDFs") that defines a group of attributes utilized by decision makers and a volume or value figure to indicate the micro-segment size. FIG. 1 illustrates a micro-segmentation system configuration 100. The micro-segmentation system configuration 100 has a micro-segmentation system 102 that is a third-party trusted system between a merchant 104 and each of a plurality of users 106. The offer provider 104 may be a company selling a product, a company selling a service, a marketing company, an advertising company, or the like that provides a campaign to the micro-segmentation system. The campaign indicates a set of target attributes that the offer provider is looking for in marketing to particular users for a product or service. The campaign may include one or more offers. Accordingly, the set of target attributes refers to the set of attributes the campaign is targeting. As an example, the campaign may be an offer for sale of men's sneakers in the United States of America. The micro-segmentation system 102 receives that campaign and also receives user attributes from the plurality of users 106. The attributes are properties or characteristics. An example of an attribute is gender. Accordingly, the values for the gender attribute may be male or female. The micro-segmentation system 102 then performs a determination of which users in the plurality of users 106 have user attribute values that match the target attributes of the campaign. In other words, the micro-segmentation system 102 evaluates the created micro-segment definitions, attributes values, and value distributions to determine the selectivity of the specific micro-segment. The micro-segmentation system 102 determines a micro-segment 108 that includes users that match the target attributes of the campaign. In one embodiment, all of the target attributes have to equal the user attributes in order for the user to be placed into the micro-segment 108. In another embodiment, a minimum matching score has to be met for the user to be placed into the micro-segment 108. As an example, a user may not have to match all of the attributes, but may match enough of the attributes to generate a score that exceeds the offer provider's minimum threshold and places the consumer in to micro-segment 108. In another embodiment, a weighting mechanism is utilized to weigh certain attributes as opposed to other attributes in the scoring methodology. For example, an age attribute may have a higher weighting in the scoring calculation than a geographic attribute. In one embodiment, the system compensates for attribute bias to prevent attribute overweighting. Similarly, marketers may be allowed to customize the weightings of micro-segment attributes in determining the selectivity of the micro-segment relative to candidate users.

In one embodiment, after the micro-segmentation system 102 automatically classifies users into the micro-segment 108, the micro-segmentation system 102 sends a micro-segment data definition to the offer provider 104. In one embodiment, the micro-segmentation system 102 captures default definitions and/or training data for classifying existing and/or new users. The quantity of segment definitions may range anywhere from a few to billions based upon the number of ways user attributes are combined and utilized. In another embodiment, that micro-segment data definition does not include personal identity information of the users in the micro-segment. In other words, the plurality of users provide attribute information to the micro-segmentation system 102 on a trusted basis such that the micro-segmentation system does not send information that personally identifies the users to the offer provider 104. The system may not send any data to the offer provider other than representative statistics or general statistics about the micro-segment they defined. As an example, a micro-segment may contain twenty-seven thousand three hundred thirty-two consumers. After the offer has been delivered, seventeen thousand three hundred forty-four consumers looked at the offer, three thousand four hundred forty-four consumers clicked on the offer to learn more, and six hundred thirty-four consumers purchased the offer. Further, in one embodiment, the plurality of users 106 provides permission to the micro-segmentation system 102 to send them offers. The micro-segment data definition received by the offer provider 104 provides information such as the number of users in the micro-segment, their attribute values, etc. The offer provider 104 can quickly determine potential interest in a campaign among a target audience, without wasting advertising and resources on people who have no interest in receiving advertising for this specific campaign. As a result, the offer provider 104 can realistically determine if the campaign is economically feasible and the amount of resources that should be dedicated to the campaign, etc. The offer provider can then send an offer to the micro-segmentation system 102 based on the micro-segment data. In other words, the offer provider 104 is not sending the offer directly to the micro-segment 108. After receiving the offer, the micro-segmentation system may then send the offer to the micro-segment. If users in the micro-segment would like to learn more about the offer or accept the offer, the users may then individually contact the offer provider by following a link or some other response mechanism provided in the offer. In another embodiment, micro-segment data other than the micro-segment data definition may also be sent to the offer provider 104. As an example, campaign performance statistics may be sent to the offer provider after the delivery of the campaign in addition to the micro-segment data definition.

In one embodiment, the micro-segmentation system 102 also performs recommendations. The micro-segmentation system 102 may deliver a recommendation to the user. In one embodiment, given any user, the micro-segmentation system 102 quickly locates all assigned micro-segments and then utilizes the assigned micro-segments to locate product, service, and/or content offers based on the matching micro-segments to generate specific recommendations. Further, the micro-segmentation system 102 may store data regarding the recommendations upon which the user acts.

In one embodiment, before each user is classified, that user is scored against all relevant micro-segments to determine the most probable classifications. Further, micro-segment classifications may be efficiently assigned to users and searchable in real-time.

Figure 2:
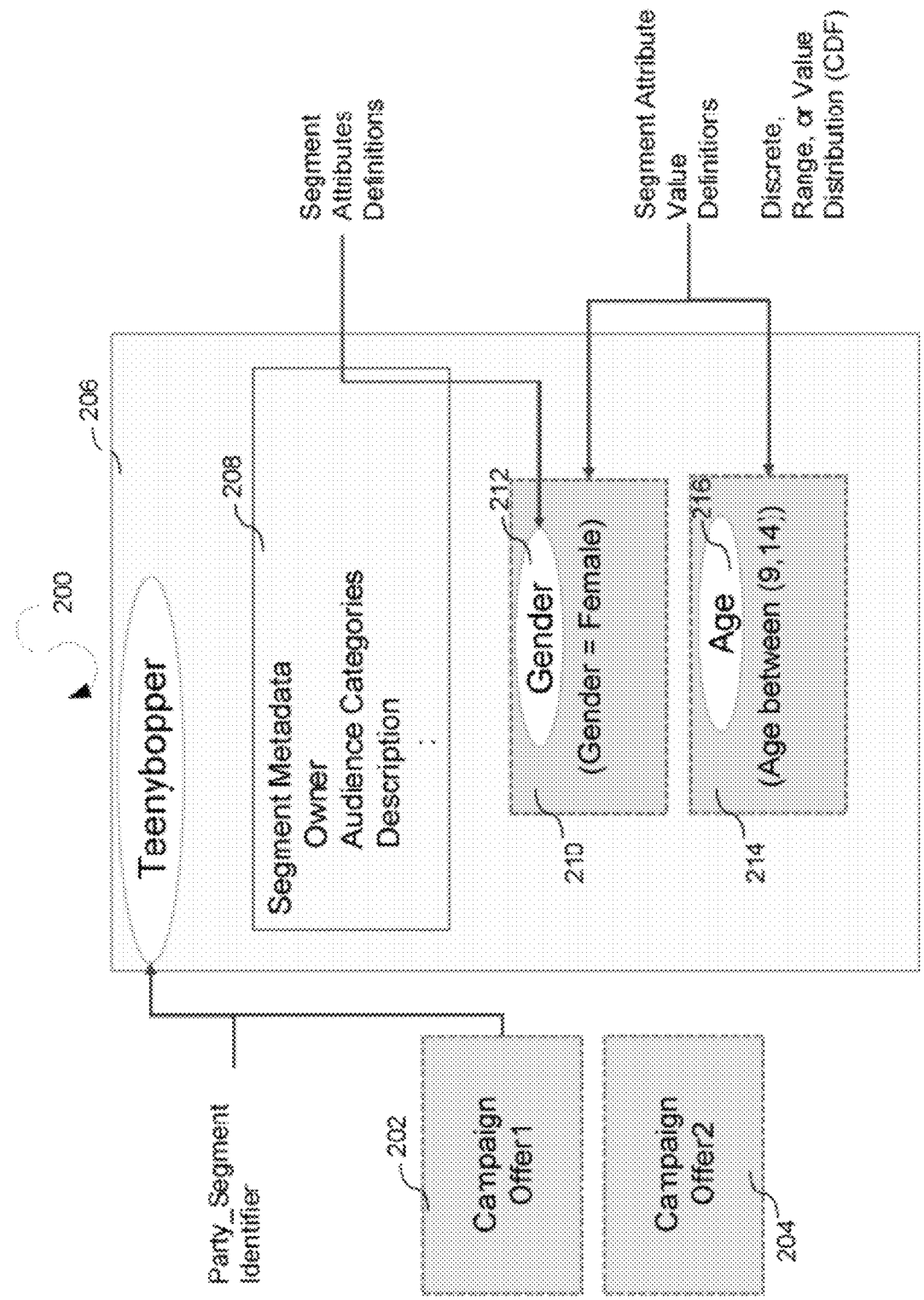
FIG. 2 illustrates a micro-segment definition and structure.

FIG. 2 illustrates a micro-segment definition and structure 200. The micro-segment definition and structure 200 has a micro-segment object 206 that may receive a campaign offer such as the first campaign offer 202 and/or the second campaign offer 204. For illustrative purposes, the micro-segment object 206 receives the first campaign offer 202. As an example, the micro-segment object 200 may receive a party_segment identifier that identifies a target party of the first campaign offer 202. For instance, the party_segment identifier may be "Teenybopper." The micro-segment object may also have segment metadata 208 that includes metadata about the segment. For example, the segment metadata 208 may have an owner name, audience categories, description of the segment, etc. The micro-segment object 206 may also have one or more segment definitions. For example, the micro-segment object 206 may have a gender segment attribute definition 212 and an age segment attribute definition 216. The micro-segment object 206 may also have segment attribute value definitions for the respective segment attribute definitions. For example, a gender segment attribute value definition 210 may equal female and an age segment attribute value definition may equal an age between nine and fourteen. Various distributions such a discrete distribution, a range distribution, or a value distribution such as Cumulative Distribution Function ("CDF") may be utilized.

Figure 3:
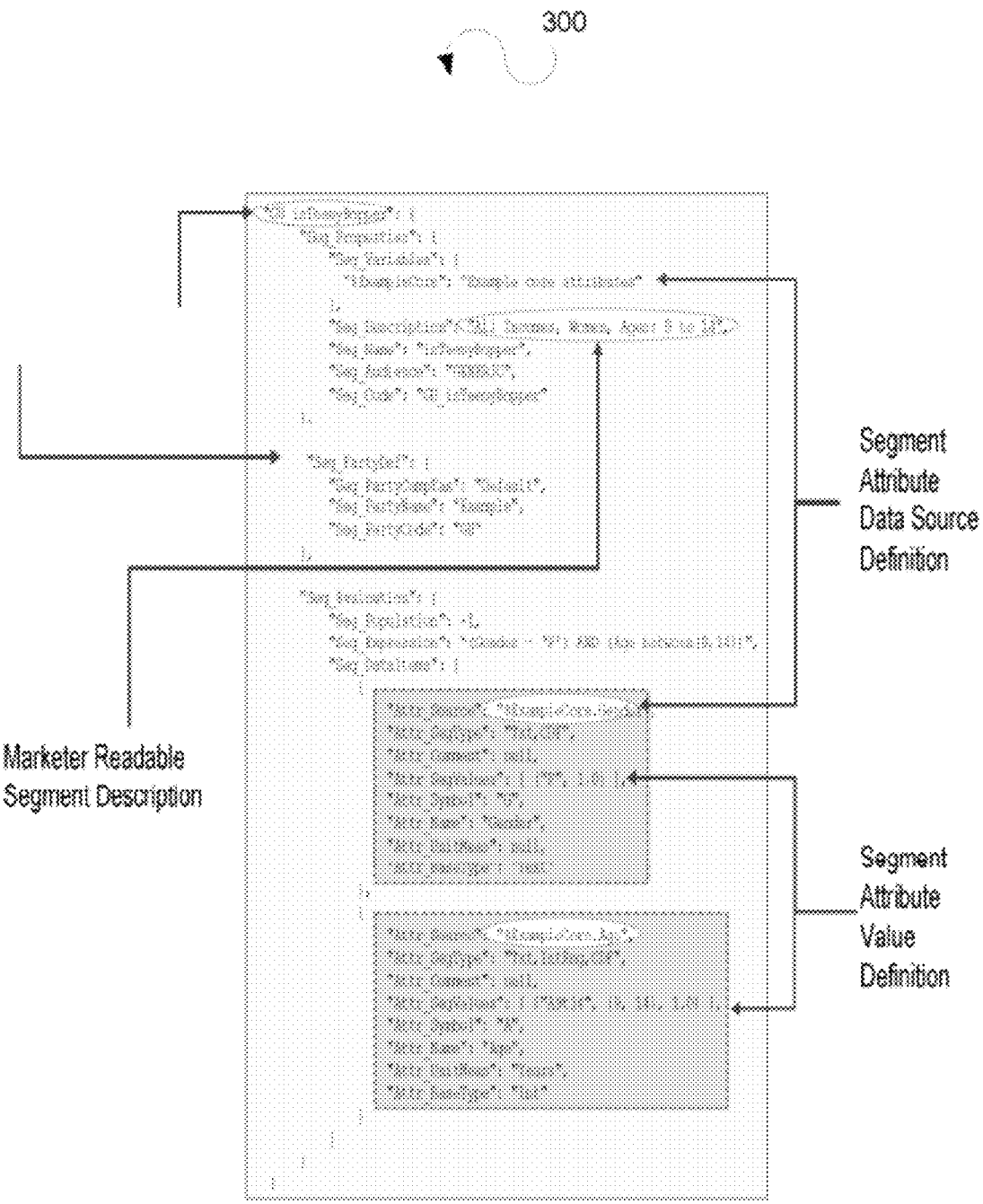
FIG. 3 illustrates an example of micro-segment definition code.

FIG. 3 illustrates an example of micro-segment definition code 300. A party_segment name portion may provide the party_segment name. As an example, the party_segment name may be "TeenyBopper." Further, a segment attribute data source definition may define the segment attribute data sources, e.g., gender. Further, a marketer readable segment description may provide a marketing description, e.g., "All Incomes, Women, Ages: 9 to 14." Further, segment attribute value definitions may be provided.

Figure 4:
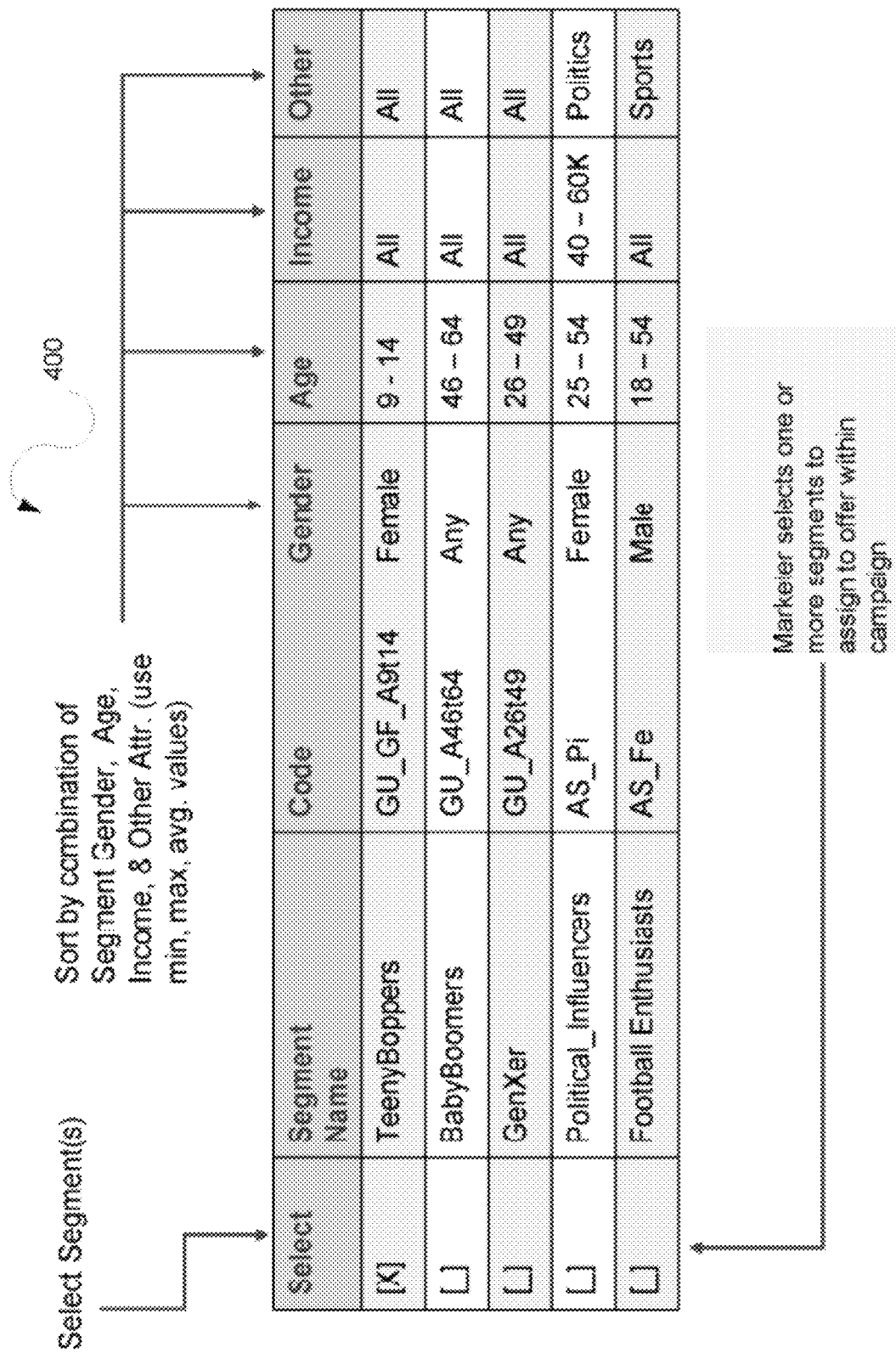
FIG. 4 illustrates an example of a graphical user interface ("GUI") that may be utilized to one more segments.

FIG. 4 illustrates an example of a GUI 400 that may be utilized to define one more segments. As an example, a marketer may select one or more segments to assign to an offer within a campaign from the GUI 400. The GUI 400 has a plurality of segments that may be selected by an input. The segments may each have a segment name, code, gender, age, income, and/or other attributes. Further, the GUI 400 may allow the user to sort by combination of segment gender, age, income, and/or other attributes. Further, minimum, maximum, and/or average values may be utilized.

Figure 5A:
FIG. 5A illustrates an example of code 500 for the written form of the expression.
Figure 5B:
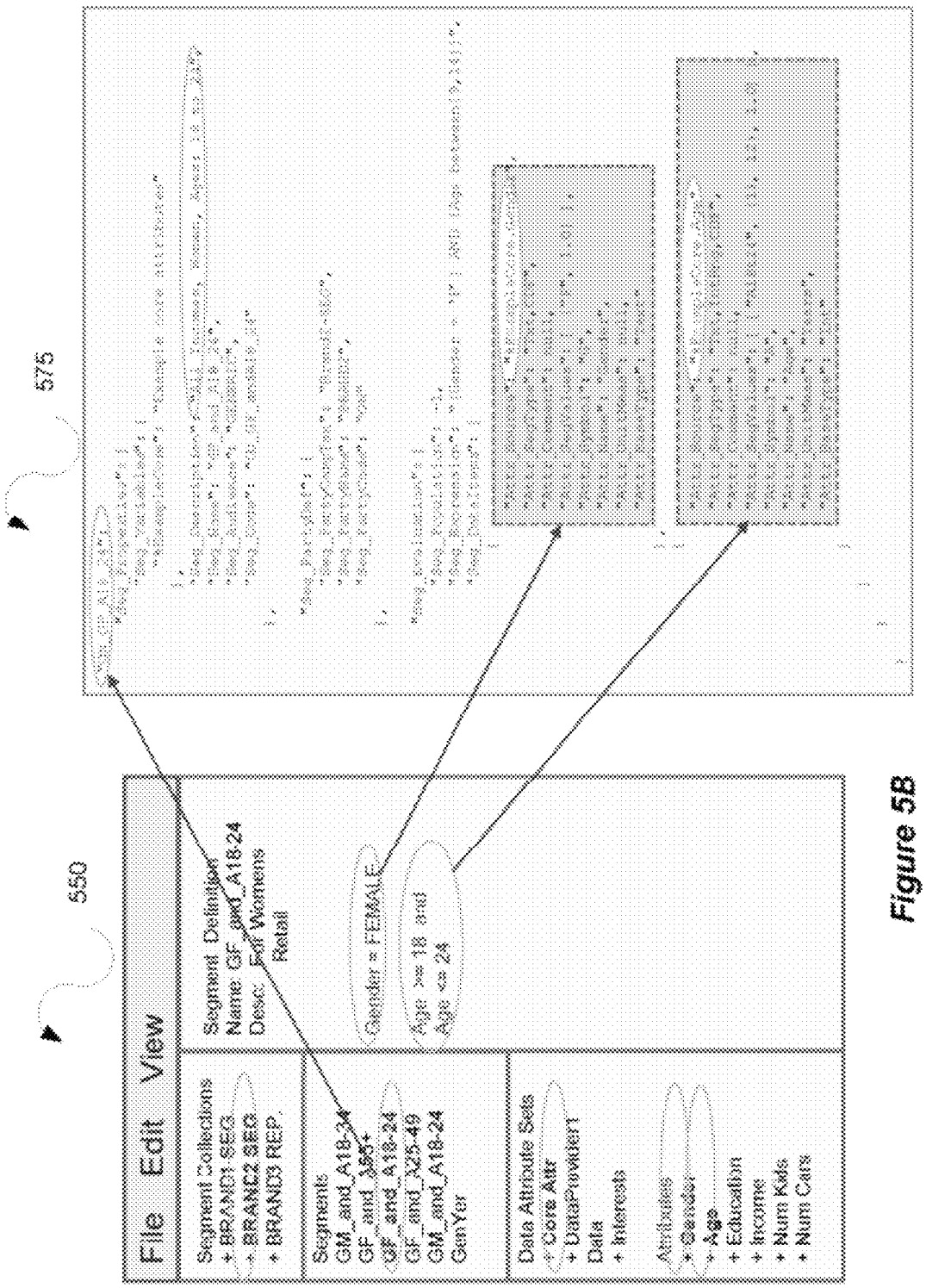
FIG. 5B illustrates an example of a segment GUI in which selections are made such that code generates segment definitions.

All of the conditions in this text description are then expressed as a collection of CONDITIONS or predicates connected by Boolean AND and OR operations. FIG. 5A illustrates an example of code 500 for the written form of the expression. In one embodiment, this segment expression can be provided directly to an evaluation and execution engine for evaluation. Further, FIG. 5B illustrates an example of a segment GUI 550 in which selections are made such that code 575 generates segment definitions.

In another embodiment, an expression parse tree based on expression syntax rules is created and provided to the evaluation and execution engine. By utilizing an expression parse tree representation, a parse step is eliminated on each expression match resulting in significantly faster execution of the segment matching expression.

Figure 6:
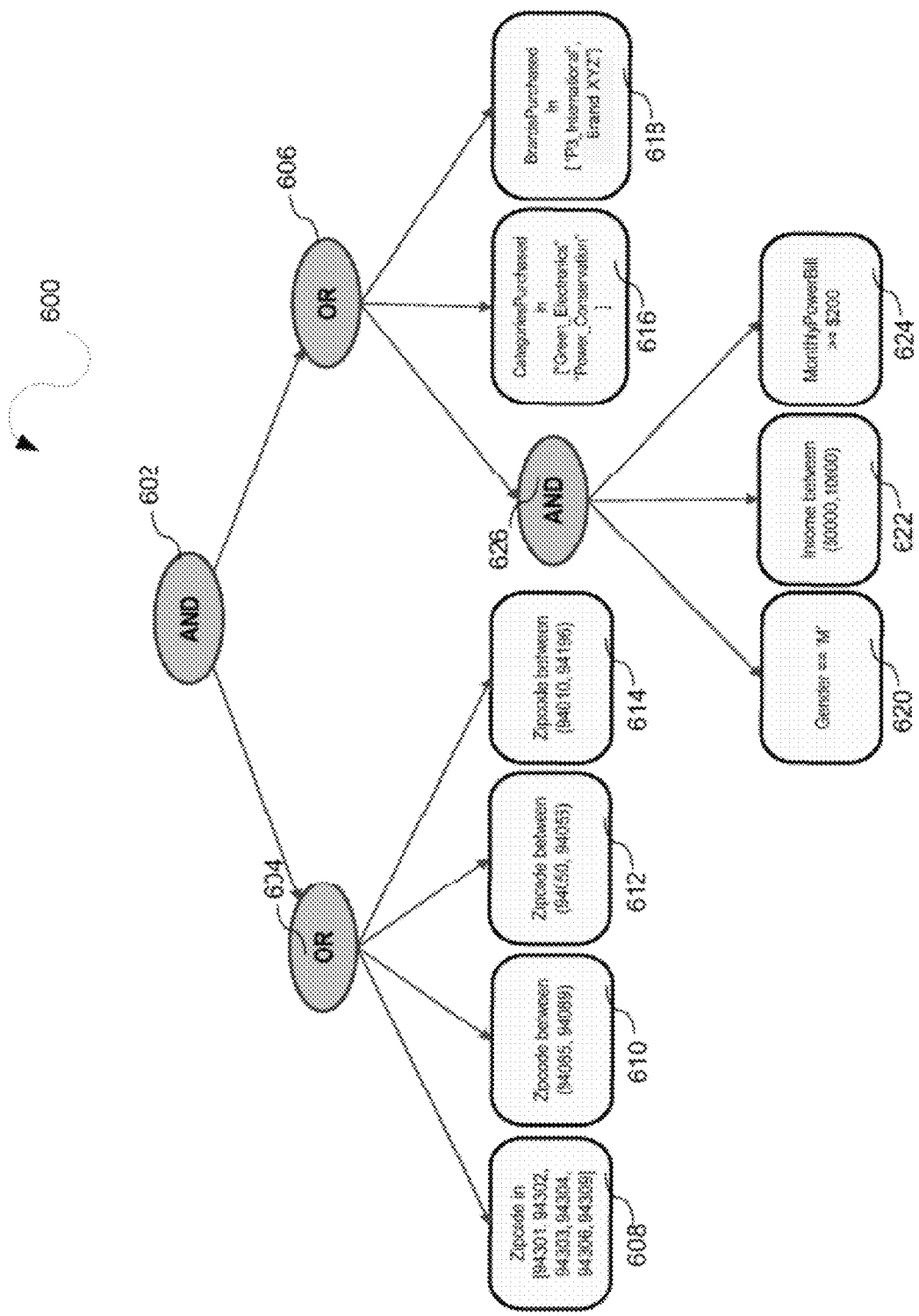
FIG. 6 illustrates an expression tree.

FIG. 6 illustrates an expression tree 600. The expression tree 600 is a tree of nodes that is created by a GUI tool. For example, a marketer who is creating segment definitions may utilize the GUI tool. Simple conditions or predicates specify a consumer attribute, e.g., zipcode, a value or list of values, e.g., 94301, 94302, . . . , and a comparison or set operator, e.g., "in." These individual conditions are evaluated, and the result of each condition is then utilized to satisfy one or more BOOLEAN expressions formed using a combination of AND or OR operators. The micro-segment object utilizes a formal expression syntax, which describes all segment expressions that can be formed and represented. The following is an example segment definition that is provided for a manufacturer interested in targeting consumers who live in certain cities, are a specific gender, have a specified income range, have made previous purchases in certain product categories, etc.:

Consumer lives in Palo Alto, Sunnyvale, Santa Clara, or San Jose (based on Zipcode)
AND (either of:)
Consumer is a Male and
Consumer's Income is between $50K and $100K and
Consumer's DataProvider1MonthlyPowerBill>=$200 and
OR
Consumer's products of interest are in "Green Electronics" or "Power Conservation" category or
Consumer has purchased products from brands "Brand ABC" or "Brand XYZ"

The expression tree 600 has a first root AND node 602, a first OR leaf node 604, and a second OR leaf node 606. The first OR leaf node 604 evaluates to TRUE if any of a first zipcode condition 608, a second zipcode condition 610, a third zipcode condition 612, or a fourth zipcode condition 614 is met. Further, the second OR leaf node 606 evaluates to true if a categories purchased condition 616 is met, a brands purchased condition 618 is met, or if an AND node 626 evaluates to TRUE. The AND node 626 evaluates to TRUE if a gender condition 620 is met, an income condition 622 is met, and a monthly power bill condition is met. The results of the first OR leaf node 604 and the second OR leaf node 606 are utilized to evaluate the AND node 602. Both results have to be TRUE for the AND node 602 to evaluate to TRUE. In other words, after all simple condition nodes are evaluated to either TRUE or FALSE and all immediate Boolean nodes are evaluated, parent Boolean nodes are evaluated by a recursive process until the root node of the expression tree is reached. At this stage, a final TRUE or FALSE value is returned to the system to determine if the consumer should be assigned into the marketer's defined segment.

In the case when consumer attribute values are missing, conditions cannot be evaluated to be either TRUE or FALSE values and a third value NULL is used. NULL values can subsequently participate in Boolean operations by using a three-valued logic system.

The expression tree 600 is provided as an example of an expression graph. A variety of other types of acyclic graphs may be utilized. An acyclic graph is a structure that is utilized to group the expression predicates. The nodes in the acyclic graph may include different syntax elements that form predicates. The syntactic acyclic graph guarantees that the expression is a valid expression that may be executed and that there will not be any syntax errors.

FIG. 7 illustrates an example of code 700 that may be utilized for the expression tree 600 illustrated in FIG. 6. The specific values, conditions, node, code, etc. provided for throughout are intended only as examples. When the code 700 is parsed and compiled, the expression tree 600 is produced.

Figure 8:
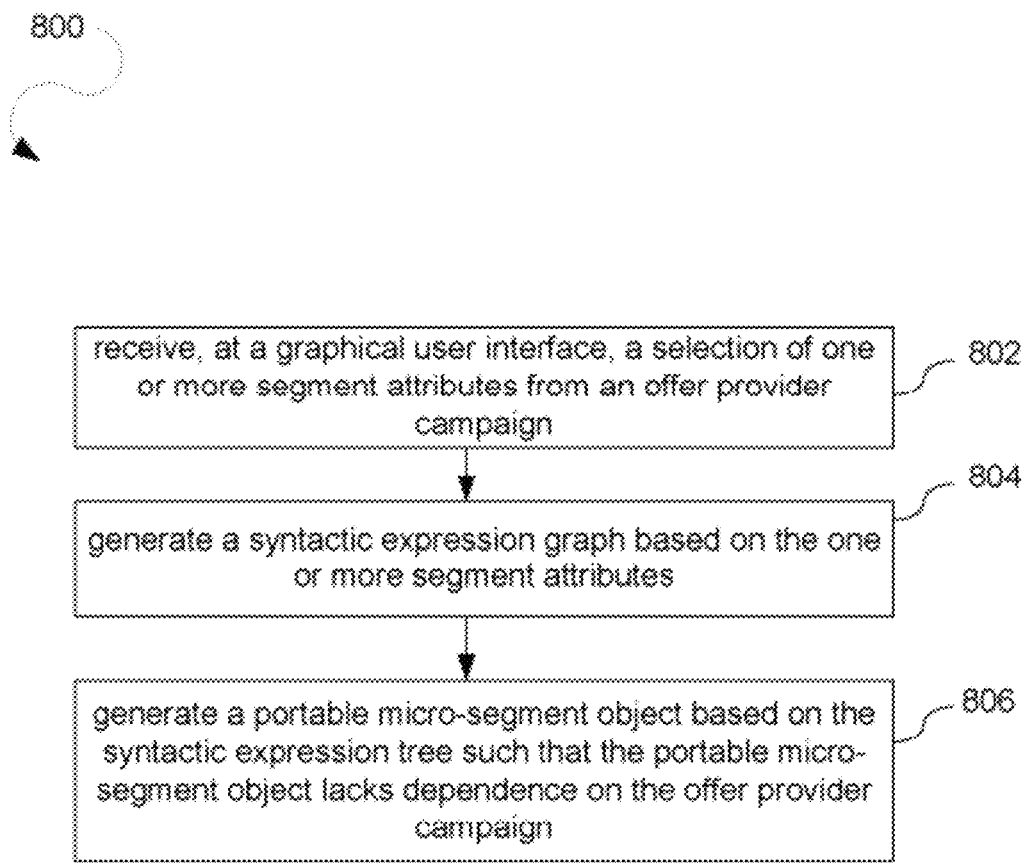
FIG. 8 illustrates a process that is utilized for defining a micro-segment object.

FIG. 8 illustrates a process 800 that is utilized for defining a micro-segment object. At a process block 802, the process 800 receives, at a graphical user interface, a selection of one or more segment attributes from an offer provider campaign. The one or more segment attributes define one or more segments that correspond to one or more offers in the offer provider campaign. Further, at a process block 804, the process 800 generates a syntactic expression graph based on the one or more segment attributes. In addition, at a process block 806, the process 800 generates a portable micro-segment object based on the syntactic expression tree such that the portable micro-segment object lacks dependence on the offer provider campaign.

Figure 9:
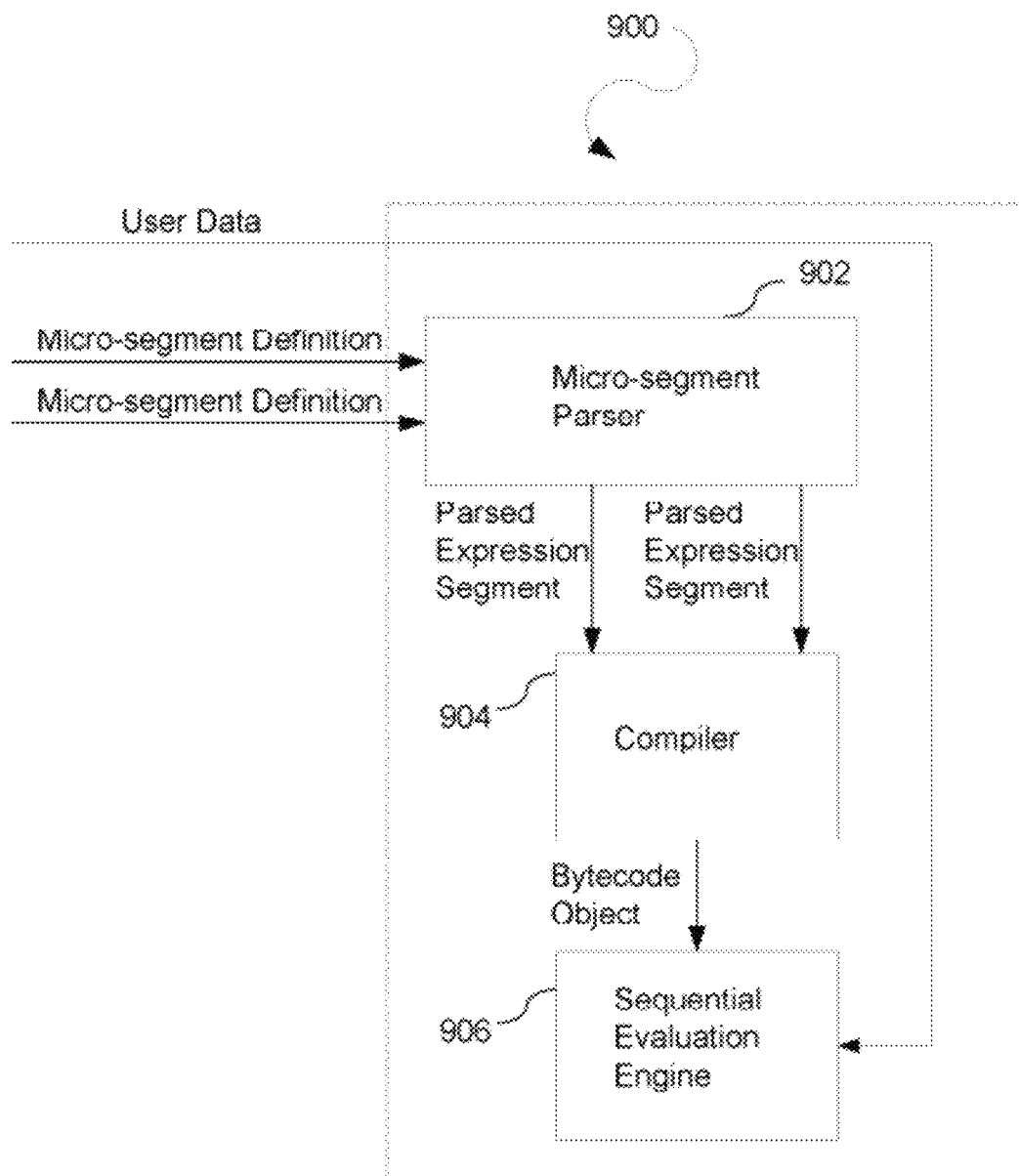
FIG. 9 illustrates a system configuration that may be utilized for defining a micro-segment.

FIG. 9 illustrates a system 900 that computes user and offer matching into micro-segments. The system 900 receives user data and a plurality of micro-segment definitions. Each micro-segment definition in the plurality of micro-segment definitions corresponds to one or more offers in an offer provider campaign. As an example, one or more marketers may enter the definitions of campaigns and one or more segment matching expressions and offers used by the campaign using a system GUI. Marketers may also choose to update or delete campaigns and segments. Further, the system 900 includes a micro-segment parser 902 that parses each micro-segment definition from the plurality of micro-segment definitions into a plurality of parsed expression segments that indicate a plurality of micro-segment condition rules. In one embodiment, the plurality of micro-segment definitions is received in a portable micro-segment object that stores analytics without user identification data. In addition, the system 900 includes a compiler 904 that compiles the plurality of parsed expression segments into an executable object, e.g., a bytecode object that indicates a plurality of instructions to determine if the user data matches the plurality of micro-segment definitions. In one embodiment, the instructions are high-level instructions. The system also includes a sequential evaluation engine 906 that (i) serially processes each micro-segment definition to apply the plurality of micro-segment condition rules to the user data to determine a match of a user belonging to a micro-segment, (ii) assigns a score to indicate the strength of each match, and (iii) ranks each match according to the score for each match. In one embodiment, the sequential evaluation engine is stored on a client computing device. For example, a user may store the sequential evaluation engine on his or her own computing device. As a result, the user may effectively restrict user information from being transmitted to unintended entities. In another embodiment, the sequential evaluation engine is operated by a single core on a server. The output of the compiler may be stored into a non-SQL ("NoSQL") database as well. In yet another embodiment, the sequential evaluation engine is operated by a single thread. The match may be determined according to a variety of logic systems. As an example, the match may be determined according to three-valued logic such that one or more Boolean predicates and one or more non-Boolean predicates are utilized. For instance, the Boolean values of True and False may be utilized along with the non-Boolean Value of Null. Further, the Null value may be a value between 0 and 1. As an example, 0.5 may be the Null value. The score may equal a weighting coefficient multiplied by the Boolean or non-Boolean value. For example, a first attribute may have a higher weighting coefficient than a second attribute because the first attribute may be more important to the user and/or campaign provider. Accordingly, an age attribute may have a weighting coefficient of 0.5. Therefore, the score may equal the value of Null multiplied by the weighting coefficient, e.g., 0.5×0.5=0.25.

In another embodiment, a persist operation is performed such that each executable object is named and stored in a database for later retrieval and use by the sequential evaluation engine 906. As an example, a logical but potentially physically distributed relational database, object-based or NOSQL key-value storage system, is utilized to store executable "bytecode" objects for later use.

In yet another embodiment, a load/refresh operation is performed. When the sequential evaluation engine 906 is invoked, or when new segment definitions are created, or when existing segment definitions are updated, the sequential evaluation engine 906 with the matching system then issues a request to load or refresh all needed segments. The Load/Refresh process may be full or incremental (using a differential configuration if only a small number of segment definitions have changed.).

In another embodiment, a match and offer delivery system utilizes the list of generated segments that a user belongs to and identifies relevant product and service offers of interest to the user based on segment criterion. A database is utilized to locate all offers associated with specific segments; these offers are sent to the delivery system for presentation to the user.

Figure 10:
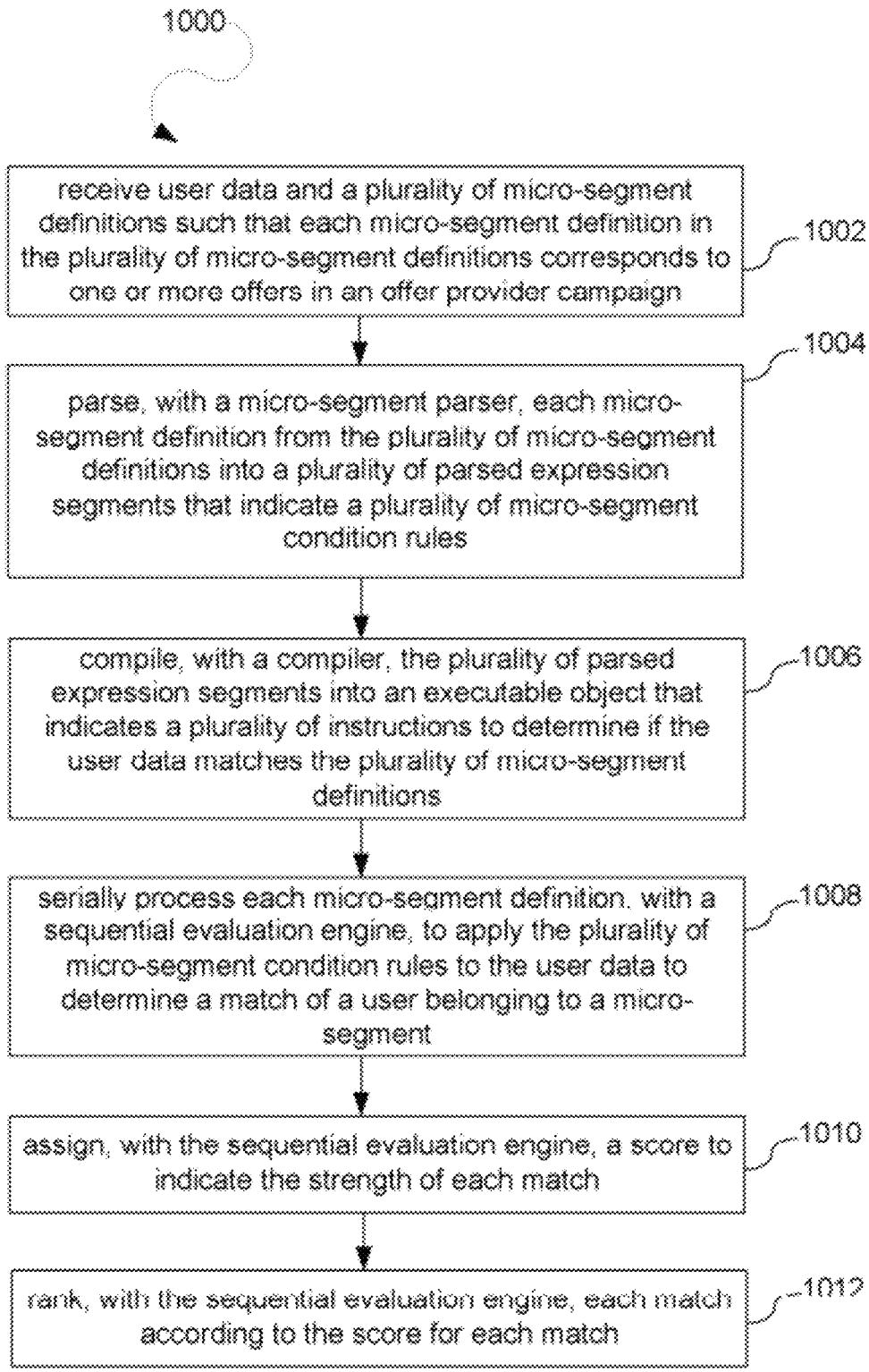
FIG. 10 illustrates a process that computes user and offer matching into micro-segments.

FIG. 10 illustrates a process 1000 that computes user and offer matching into micro-segments. At a process block 1002, the process 1000 receives user data and a plurality of micro-segment definitions such that each micro-segment definition in the plurality of micro-segment definitions corresponds to one or more offers in an offer provider campaign. Further, at a process block 1004, the process 1000 parses, with a micro-segment parser, each micro-segment definition from the plurality of micro-segment definitions into a plurality of parsed expression segments that indicate a plurality of micro-segment condition rules. In addition, at a process block 1006, the process 1000 compiles, with a compiler, the plurality of parsed expression segments into an executable object that indicates a plurality of instructions to determine if the user data matches the plurality of micro-segment definitions. At a process block 1008, the process 1000 also serially processes each micro-segment definition, with a sequential evaluation engine, to apply the plurality of micro-segment condition rules to the user data to determine a match of a user belonging to a micro-segment. Further, at a process block 1010, the process 1000 assigns, with the sequential evaluation engine, a score to indicate the strength of each match. In addition, at a process block 1012, the process 1000 ranks, with the sequential evaluation engine, each match according to the score for each match.

Figure 11:
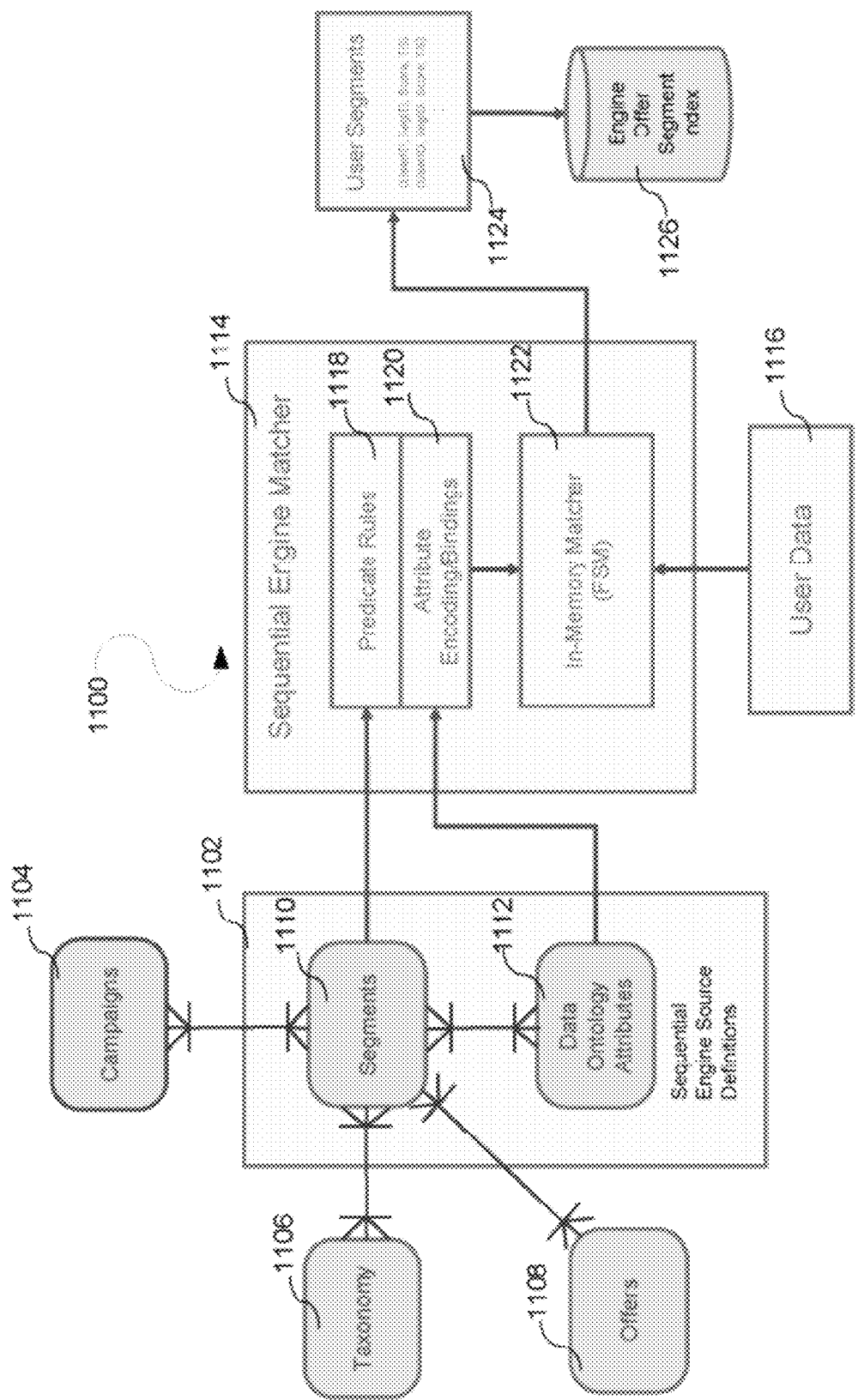
FIG. 11 illustrates a sequential engine matching system.

FIG. 11 illustrates a sequential engine matching system 1100. Sequential engine source definitions 1102 receive campaigns 1104, a taxonomy 1106, and offers 1108 to generate segments 1110. Further, the sequential engine source definitions generate data ontology attributes 1112 from the segments 1110. A sequential engine matcher 1114 has predicate rules 1118 that receive the segments 1110 and attribute encoding/bindings 1120 that receive the data ontology attributes 1112. An In-Memory Matcher 1122 receives the attribute encoding/bindings 1120 and user data 1116. The In-Memory Matcher 1122 then generates user segments 1124. As an example, a user segment may have a UserID, SegID, Score, and TimeStamp ("TS"). The user segments 1124 are then stored in an engine offer segment index 1126.

Figure 12:
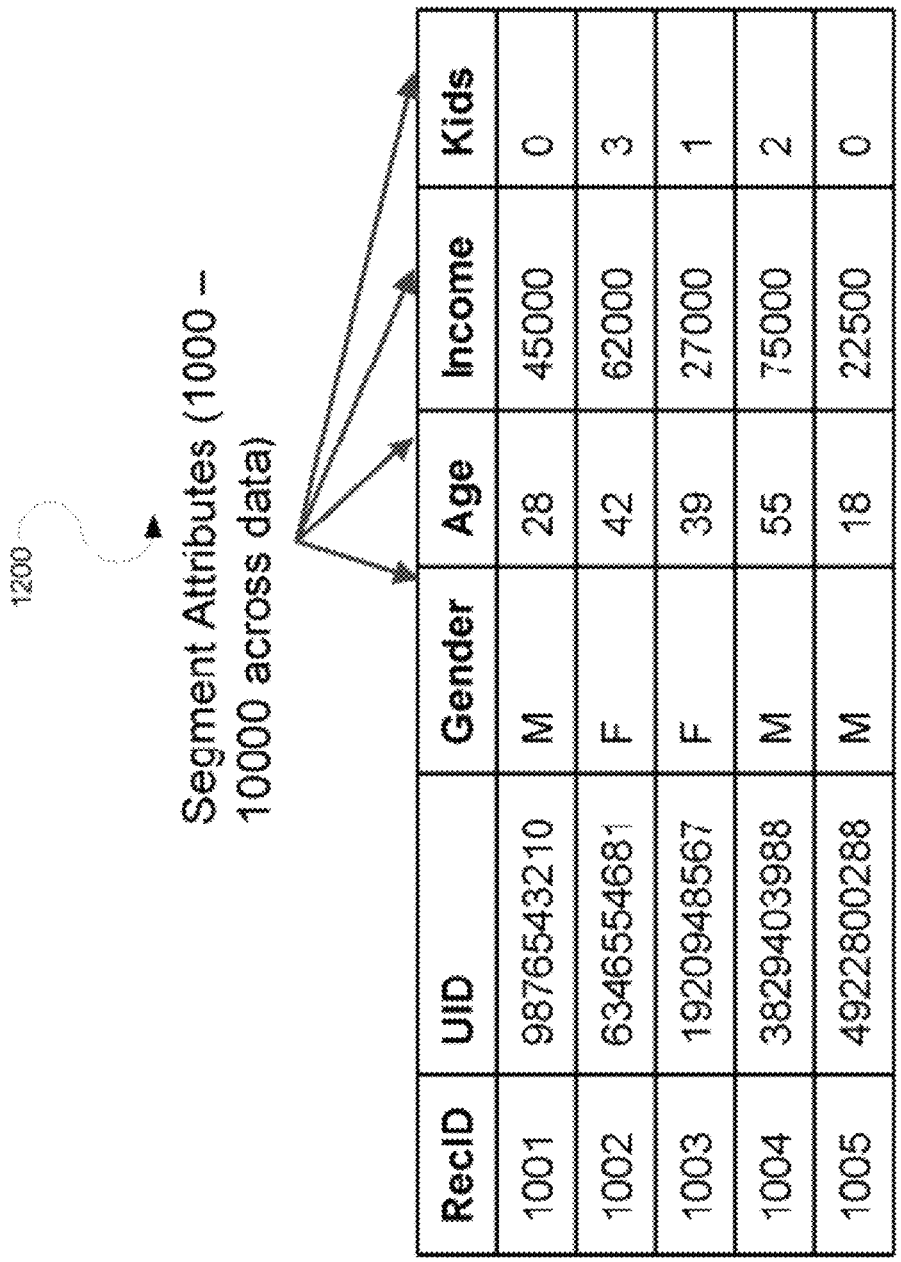
FIG. 12 illustrates a table that indicates a variety of segment attributes.

FIG. 12 illustrates a table 1200 that indicates a variety of segment attributes. The table may include a variety of fields such as RecID, UID, Gender, Age, Income, and Kids. These fields are provided as examples for illustrative purposes as a variety of other fields may be utilized.

FIG. 13A illustrates a row storage data layout 1300 for the segment attributes illustrated in FIG. 12. The row storage data layout 1300 provides a fast speed for getting/setting all attributes for user.

Figure 13B:
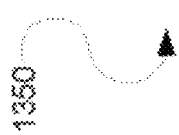
FIG. 13B illustrates a column storage data layout for the segment attributes illustrated in FIG. 12.

FIG. 13B illustrates a column storage data layout 1350 for the segment attributes illustrated in FIG. 12. The column storage data layout 1350 provides a fast speed for getting users with segment Attr=X value, segmenting users in batch mode into micro-segments, and counting users in defined segments.

Figure 14:
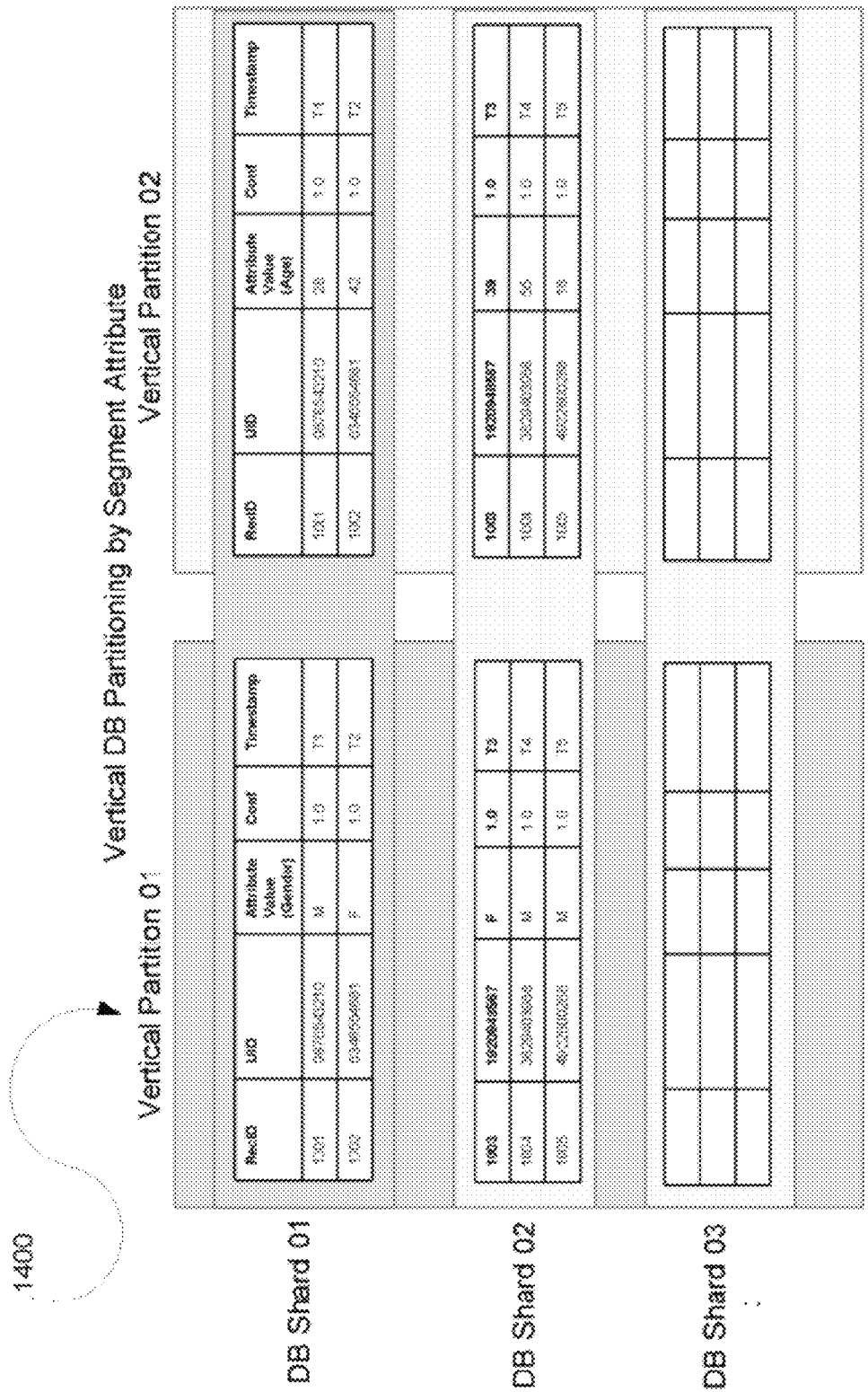
FIG. 14 illustrates an analytics data storage system.

FIG. 14 illustrates an analytics data storage system 1400. In one embodiment, a database is vertically partitioned by segment attribute. As an example, a first vertical partition is based on the attribute value of gender whereas a second vertical partition is based on the attribute value of age.

Figure 15:
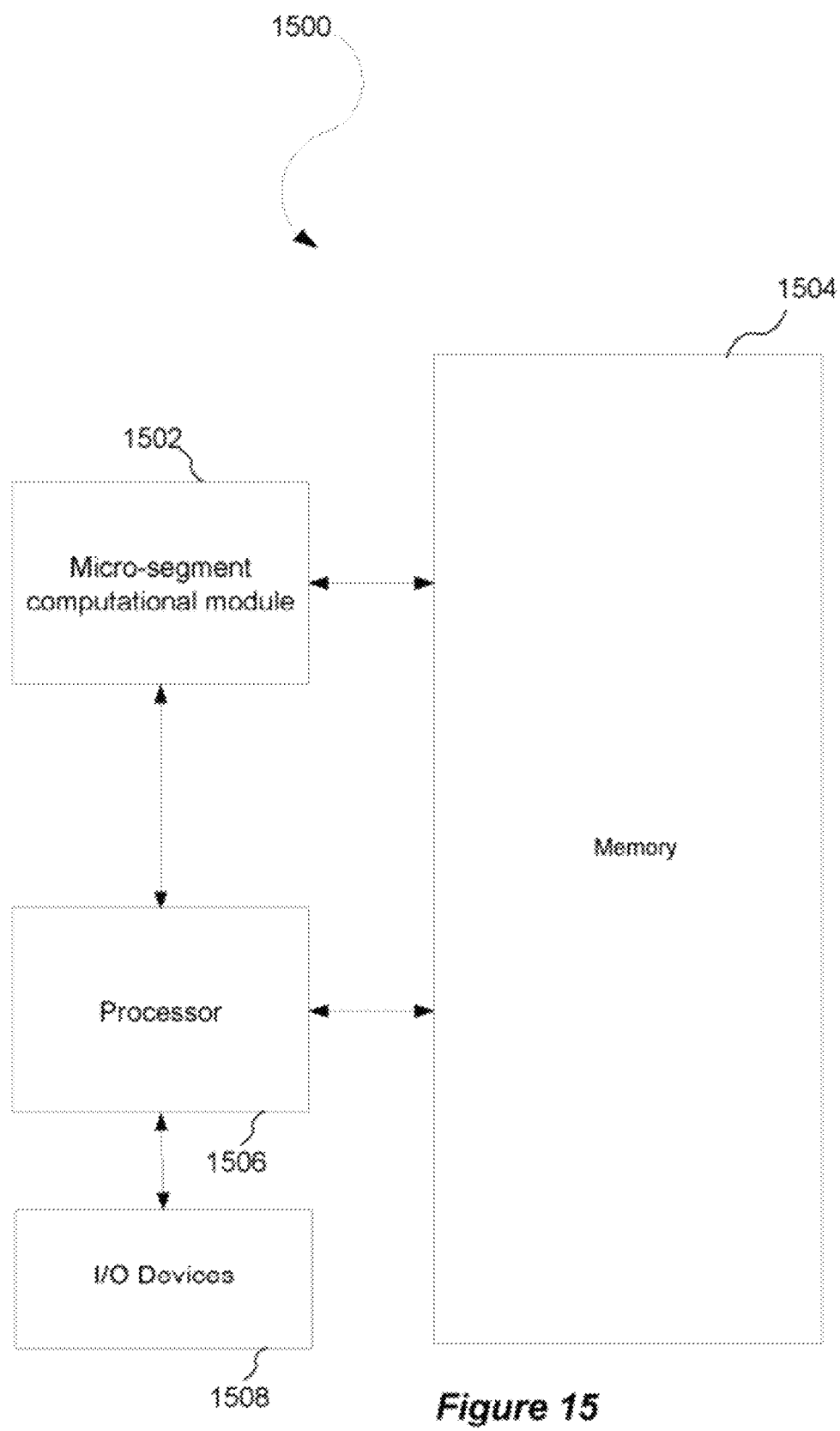
FIG. 15 illustrates a system configuration that may be utilized for computing user and offer matching into a micro-segment.

FIG. 15 illustrates a system configuration 1500 that may be utilized for computing user and offer matching into a micro-segment. In one embodiment, a micro-segment computational module 1502 interacts with a memory 1504. In one embodiment, the system configuration 1500 is suitable for storing and/or executing program code and is implemented using a general purpose computer or any other hardware equivalents. The processor 1506 is coupled, either directly or indirectly, to the memory 1504 through a system bus. The memory 1504 can include local memory employed during actual execution of the program code, bulk storage, and/or cache memories which provide temporary storage of at least some program code in order to reduce the number of times code must be retrieved from bulk storage during execution.

The Input/Output ("I/O") devices 1508 can be coupled directly to the system configuration 900 or through intervening input/output controllers. Further, the I/O devices 1508 may include a keyboard, a keypad, a mouse, a microphone for capturing speech commands, a pointing device, and other user input devices that will be recognized by one of ordinary skill in the art. Further, the I/O devices 1508 may include output devices such as a printer, display screen, or the like. Further, the I/O devices 1508 may include a receiver, transmitter, speaker, display, image capture sensor, biometric sensor, etc. In addition, the I/O devices 1508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 1500 to enable the system configuration 1500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A system comprising:
one or more processors; and
at least one storage device storing a computer readable program, wherein the computer readable program when executed by the one or more processors causes the system to perform operations comprising:
receiving user attributes and a plurality of micro-segment definitions such that each micro-segment definition in the plurality of micro-segment definitions corresponds to one or more offers in an offer provider campaign;
parsing each micro-segment definition from the plurality of micro-segment definitions into a plurality of parsed expression segments that indicate a plurality of micro-segment condition rules;
compiling the plurality of parsed expression segments into an executable object that indicates a plurality of instructions to determine if the user attributes match the plurality of micro-segment definitions;
serially processing each micro-segment definition to apply the plurality of micro-segment condition rules to the user attributes to determine a match of a user to individual micro-segments that are each associated with a respective instance of the plurality of micro-segment definitions;
assigning a score from multiple possible scores to indicate a strength of each match of the user to the individual micro-segments such that each match has a respective score;
ranking each match according to the score for each match;
placing the user into a particular micro-segment based on a score for the user exceeding a threshold score for the particular micro-segment;
correlating the particular micro-segment to a micro-segment object that includes attributes and analytics for the particular micro-segment and does not include personal identity information for the user;
communicating the micro-segment object to an offer provider of the offer provider campaign;
receiving an offer from the offer provider; and
communicating the offer to the user.

2. The system of claim 1, wherein said processing, said assigning, and said ranking are performed by a sequential evaluation engine stored on a client computing device.

3. The system of claim 1, wherein said processing, said assigning, and said ranking are performed by a sequential evaluation engine operated by a single core on a server.

4. The system of claim 1, wherein said processing, said assigning, and said ranking are performed by a sequential evaluation engine operated by a single thread.

5. The system of claim 1, wherein the plurality of micro-segment definitions is received via the micro-segment object.

6. The system of claim 1, wherein the executable object is bytecode.

7. The system of claim 1, wherein the match is determined according to three-valued logic such that one or more Boolean predicates and one or more non-Boolean predicates are utilized.

8. A method comprising:
receiving user data and a plurality of micro-segment definitions such that each micro-segment definition in the plurality of micro-segment definitions corresponds to one or more offers in an offer provider campaign;
parsing each micro-segment definition from the plurality of micro-segment definitions into a plurality of parsed expression segments that indicate a plurality of micro-segment condition rules;
compiling the plurality of parsed expression segments into an executable object that indicates a plurality of instructions to determine if the user data matches the plurality of micro-segment definitions;
serially processing each micro-segment definition to apply the plurality of micro-segment condition rules to the user data to determine a match of a user to individual micro-segments that are each associated with a respective instance of the plurality of micro-segment definitions;
assigning a score to indicate a strength of each match of the user to the individual micro-segments such that each match has a respective score;
ranking each match according to the score for each match;
placing the user into a particular micro-segment based on a score for the user exceeding a threshold score for the particular micro-segment;
correlating the particular micro-segment to a micro-segment object that includes attributes and analytics for the particular micro-segment and does not include personal identity information for the user;
communicating the micro-segment object to an offer provider of the offer provider campaign;
receiving an offer from the offer provider; and
communicating the offer to the user.

9. The method of claim 8, wherein said processing, said assigning, and said ranking are performed by a sequential evaluation engine stored on a client computing device.

10. The method of claim 8, wherein said processing, said assigning, and said ranking are performed by a sequential evaluation engine operated by a single core on a server.

11. The method of claim 8, wherein said processing, said assigning, and said ranking are performed by a sequential evaluation engine operated by a single thread.

12. The method of claim 8, wherein the plurality of micro-segment definitions is received via the micro-segment.

13. The method of claim 8, wherein the executable object is bytecode.

14. The method of claim 8, wherein the match is determined according to three value logic such that one or more Boolean predicates and one or more non-Boolean predicates are utilized.

15. A system comprising:
a reception module configured to receive user data and a plurality of micro-segment definitions such that each micro-segment definition in the plurality of micro-segment definitions corresponds to one or more offers in an offer provider campaign;
a micro-segment parser configured to parse each micro-segment definition from the plurality of micro-segment definitions into a plurality of parsed expression segments that indicate a plurality of micro-segment condition rules;
a compiler configured to compile the plurality of parsed expression segments into an executable object that indicates a plurality of instructions to determine if the user data matches the plurality of micro-segment definitions;
a processor having a sequential evaluation engine configured to:
serially process each micro-segment definition to apply the plurality of micro-segment condition rules to the user data to determine a match of a user belonging to individual micro-segments that are associated with a respective instance of the plurality of micro-segment definitions;
assign a score to indicate a strength of each match of the user to the individual micro-segments such that each match has a respective score;
rank each match according to the score for each match;
place the user into a particular micro-segment based on a score for the user exceeding a threshold score for the particular micro-segment;
correlate the particular micro-segment to a micro-segment object that includes attributes and analytics for the particular micro-segment and does not include personal identity information for the user;
communicate the micro-segment object to an offer provider of the offer provider campaign;
receive an offer from the offer provider; and
communicate the offer to the user.

16. The system of claim 15, wherein the sequential evaluation engine is stored on a client computing device.

17. The system of claim 15, wherein the sequential evaluation engine is operated by a single core on a server.

18. The system of claim 15, wherein the sequential evaluation engine is operated by a single thread.

19. The system of claim 15, wherein the plurality of micro-segment definitions is received via the micro-segment object.

20. The system of claim 15, wherein the executable object is bytecode.

* * * * *